E. MULDER.
FAUCET.
APPLICATION FILED DEC. 11, 1909.

979,084.

Patented Dec. 20, 1910.
2 SHEETS—SHEET 1.

Witnesses:

Inventor
Everett Mulder
By his Attorney

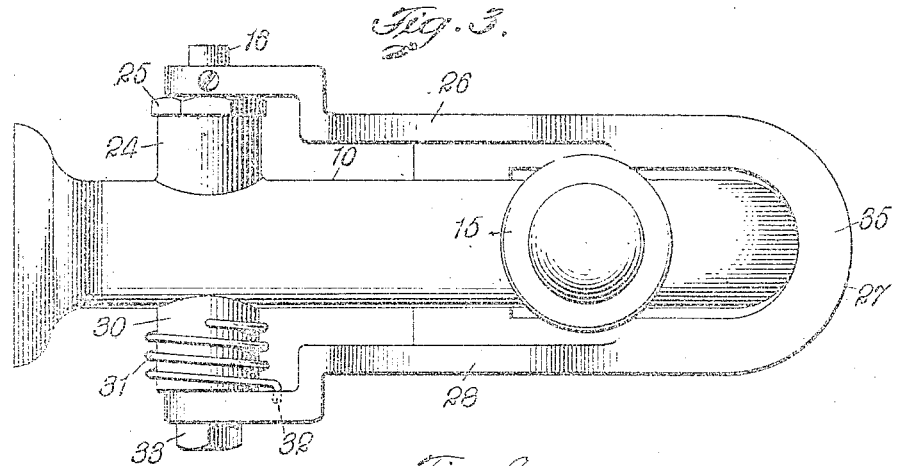
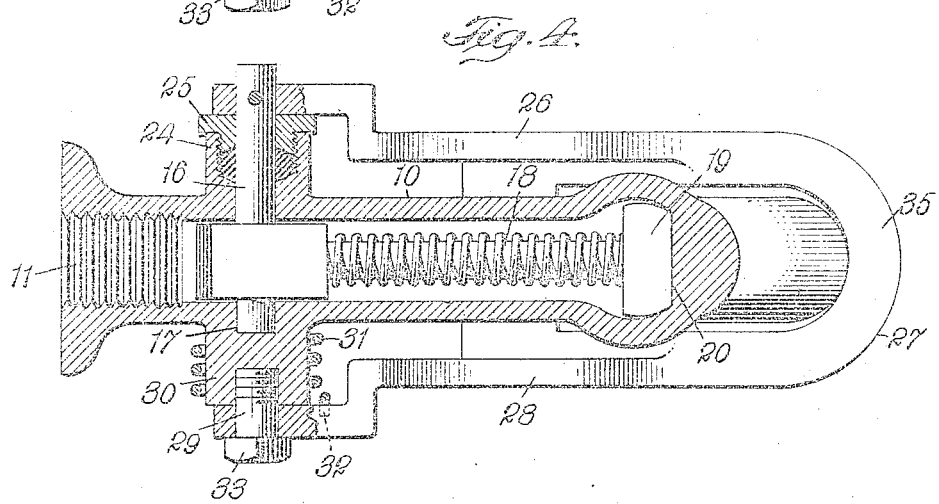
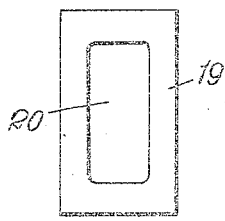

UNITED STATES PATENT OFFICE.

EVERETT MULDER, OF NEW YORK, N. Y.

FAUCET.

979,084. Specification of Letters Patent. Patented Dec. 20, 1910.

Application filed December 11, 1909. Serial No. 532,564.

*To all whom it may concern:*

Be it known that I, EVERETT MULDER, a citizen of the United States, residing in the city of New York, county and State of New York, have invented certain new and useful Improvements in Faucets, of which the following is a full, clear, and exact specification.

My invention relates to faucets, especially to that class where the valve of the faucet is operated by the receptacle to be filled and automatically closed as soon as said receptacle is removed. In devices of the character mentioned it is a common practice to make use of valves of various constructions to effect an automatic closure but practice has proven that an absolute and perfect closure could not be obtained with any of them, and they soon started to leak, thus causing loss of liquids and other annoying inconveniences as well as frequent repairs. Moreover, access to the operating parts of such valves is difficult and in some instances the entire faucet must be removed or taken apart to inspect the valve or to replace parts worn out. The faucet forming the object of this invention avoids all these inconveniences by providing a valve which is and remains at all times perfectly tight and is easily manufactured besides being simple, inexpensive, yet exceedingly durable in construction and which at all times allows ready access to all the parts thereof so that when worn-out, the same may easily be repaired, exchanged or replaced.

To these ends the invention consists of a faucet embracing a valve, the stem of which is operated by the action of an operating frame tending to open the valve during its rise and to close it automatically after a desired quantity of liquid has been discharged from the faucet.

Figure 1:
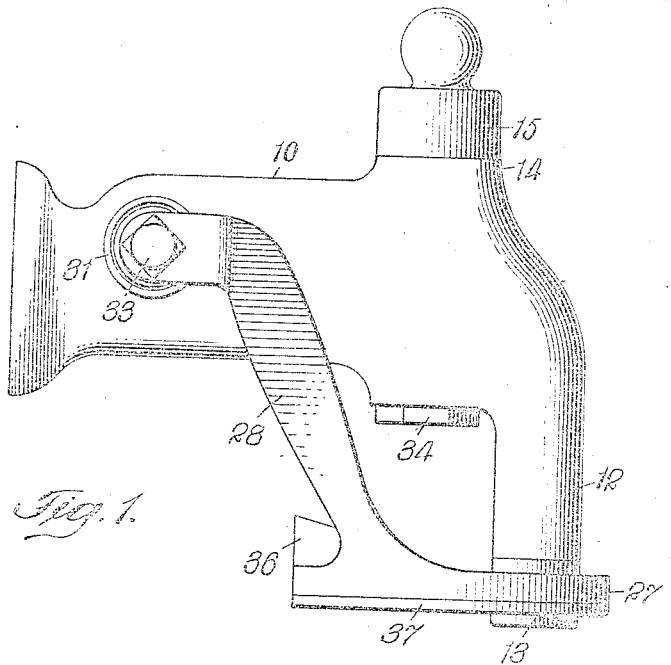
Figure 2:
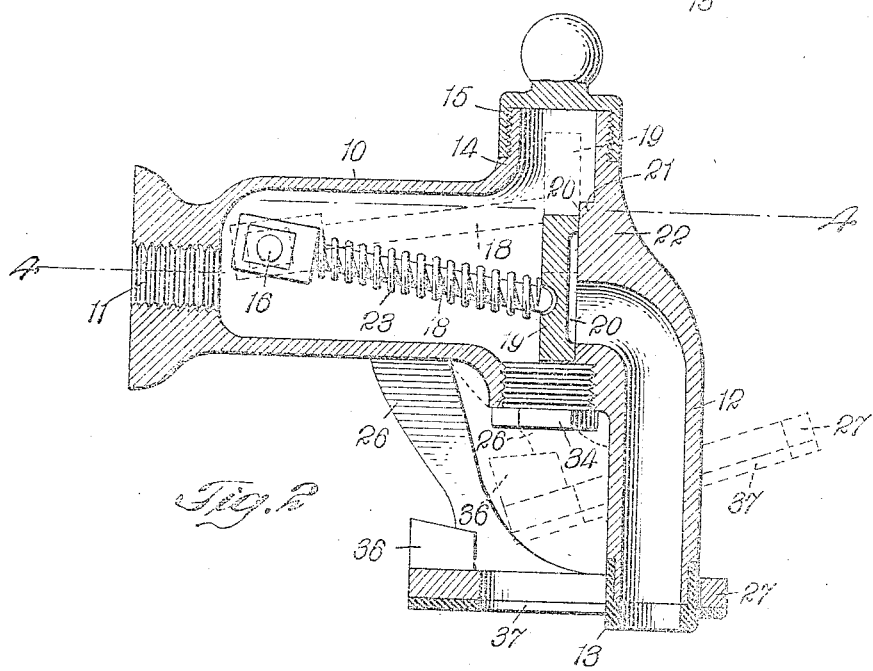

The invention furthermore consists in the combination of parts in said faucet as hereinafter described and more particularly pointed out in the claims at the end of this specification and illustrated in the accompanying drawings, in which:

Figure 1 is a side elevation of a faucet according to the present invention. Fig. 2 is a longitudinal vertical section through the faucet, showing in dotted lines the operating-frame and valve in a raised position when liquid is discharged therefrom. Fig. 3 is a top plan view. Fig. 4 is a horizontal cross-section, and Fig. 5 a detail view of the latch-plate used in connection with my improved faucet.

The body 10 of a faucet of any suitable form or shape and made of any desired material is provided, the rear end of which is internally threaded, as at 11, so as to be adapted to engage the threaded end of a feed-pipe or the like. The front end of said body 10 has the well known discharge-spout 12 provided with a rubber tip 13 and a head 14 which is closed by a removable cover 15 screwed upon or otherwise conveniently fastened to said body 10 so as to afford ready access to the parts in the interior of the faucet when said cover 15 is removed.

A shaft 16 extending horizontally through one of the side walls of the body 10 in proximity to its rear end rests with its inner end in a suitable recess 17 in the inside of the opposite wall of said body 10 and said shaft 16 carries in the interior of the faucet a valve-stem 18 keyed with its rear end upon said shaft 16 or otherwise secured thereto, so as to follow the movement of the shaft 16. The free end of said valve-stem 18 carries a valve 19 adapted to be raised or lowered with the stem 18, and said valve is recessed on one side, as at 20, so as to make the faucet thoroughly water-tight by creating suction between the opposing surfaces of said valve 19, and the valve-seat or valve-guide 20, which is formed by the projection 21 on the interior of the enlarged part 22 of the body 10 of the faucet. A spiral spring 23 encircling said valve-stem 18 is pressing with one of its ends against the rear side of the valve 19, meanwhile its other end is resting against the hub of the stem. The spring 23 is tending to firmly and securely press at all times the valve 19 upon its seat or guide 20, thus insuring at all times a tight closure of the valve, even in case the seat 20 becomes worn by frequent use. The free end of the shaft 16, projecting through one of the side-walls, is guided through a sleeve 24 which is interiorly threaded and adapted to receive a threaded tightening nut 25, and said shaft 16 carries one arm 26 of the operating-frame 27 firmly connected to the shaft 16, the other arm 28, being pivotally connected at 29 to a projection or base 30 at the opposite wall of the faucet body 10. A strong spiral spring 31 encircling said projection 30 is with one of its ends firmly secured to said projection, meanwhile its other end firmly engages the walls of a recess 32 in the conveniently bent upper part of arm 28, tending at all times to press said arm into its lowered position. A locking nut 33 upon the outer threaded end of the pivot 29 holds the arm 28 firmly upon its seat upon the pivot pin without hindering its rotation.

When the faucet is closed, the valve 19 rests with its lower edge upon the upper end of a plug 34 screwed from below into the body part of the faucet so that also here a free and ready access to the valve 19 is insured and said valve can easily and quickly be exchanged if necessity arises without disturbing the other parts of the device.

The arms of the operating frame 27 extend around the sides, front and rear of the discharge spout and may be firmly connected with each other so as to form a loop 35 which is operated by pressing from the underside the vessel to be filled, so that both arms 26 and 28 are compelled to simultaneously execute the same movements. A stop 36 upon the connection of said arms in rear of the spout serves to limit the upward movement of said operating frame 27 by striking against the underside of the plug 34. As mentioned above, the spout is tipped with rubber and the underside of the loop of the operating-frame is also mounted with a cushion 37 of rubber or other suitable elastic material, so as to avoid all damage to the vessels to be filled during the operation of said frame.

My device operates as follows: A glass, cup or other vessel to be filled is brought under the loop of the operating-frame and raised by hand thus also raising the arms 26 and 28 against the action of the spring 31 to a position shown by dotted lines in Fig. 2. By this movement the arm 26 will raise the stem 18 with said valve which will be opened and allowing the liquid freely to pour into the receptacle. As soon as the glass or cup is removed from its position under the loop of the frame, the weight of the latter and the force exerted by spring 31 will carry the arm 28 and also the entire frame back into its original lowered position of rest and the arm 26 will be turned around its pivot and move the stem of the valve back into its original position and carry said valve into its position of rest so that the valve, after the removal of the receptacle to be filled, will instantly be tightly closed and all loss of liquid be avoided.

Changes may be made in the shape and proportions of the parts forming my improved faucet without departing from the scope of the present invention as described and laid down in the claims, therefore, I do not wish to be limited to the particular form of faucet herein described and shown.

Having thus described my invention, I claim as new and desire to secure by Letters Patent:—

1. A faucet of the character described comprising a body, a valve within said body, an operating frame to open and close said valve automatically, actuated by the vessel to be filled, said frame comprising two rigidly connected arms, one being adapted to open said valve simultaneously with the lifting of said frame by the vessel to be filled, and the other to close said valve simultaneously with the removal of said vessel from underneath the operating-frame, substantially as described.

2. A faucet of the character described comprising a body, embodying a head and a discharge spout, said head having a removable cover, a valve seat within the body, a valve also within said body and working against said seat and closing the discharge opening of the spout, a stem carrying said valve, a spring disposed around said stem, and adapted to hold the valve firmly against its seat and means to operate said valve, substantially as described and for the purpose set forth.

3. A faucet of the character described comprising a body portion embodying a head and a discharge spout, a valve within said body, an operating-frame to open and close said valve automatically, said frame consisting of a pair of rigidly connected arms, one of said arms being adapted to open said valve simultaneously with the lifting of the frame by a vessel to be filled, and the other to close said valve simultaneously with the removal of said vessel from underneath said frame, substantially as described and for the purpose set forth.

4. A faucet of the character described comprising a body, an operating-frame composed of two arms and a connecting loop for the lower ends of both arms, a horizontal shaft journaled in a recess of one of the inner side walls of said body, extending through the opposite wall, and a tightening cap and nut secured in a sleeve of said wall, carrying the upper end of one of said arms firmly connected thereto, a valve-stem keyed upon the inner end of said shaft, a valve carried by the free end of said stem following its up and down stroke and a spring interposed between the hub of said stem and said valve firmly pressing the same against its seat substantially as described and for the purpose set forth.

5. A faucet of the character described comprising a body, a valve within said body, an operating frame composed of two arms, a loop connecting the lower ends of said arms, one of the arms being pivotally connected to a horizontal shaft in the proximity of the rear end of said body portion, the other being pivotally connected to a projection at the outer side of the opposite wall of said body, a spring disposed around said projection and having one end embedded in the upper bent part of said arm and being adapted to hold said arm in depressed condition, substantially as described and for the purpose set forth.

6. A faucet of the character described comprising a body portion, embodying a head and a discharge spout, a valve within said body adapted to be operated by a pair of arms of an operating-frame, connections firmly connecting the lower ends of these arms in front and in rear of said spout forming a loop for the passage of the rubber-tipped end of the spout, a stop upon the rear connection of said arms, a plug screwed in the body from below for the purpose of limiting the upward movement of the frame substantially as described.

7. A faucet of the character described comprising a body, an operating-frame composed of two arms and a connecting loop for the lower ends of both arms, a horizontal shaft journaled in a recess of one of the inner side walls of said body, extending through the opposite wall, and a tightening cap and nut secured in a sleeve of said wall, carrying the upper end of one of said arms firmly connected thereto, a valve-stem keyed upon the inner end of said shaft, a valve carried by the free end of said stem following its up and down stroke and a spring interposed between the hub of said stem and the valve firmly pressing the same against its seat, and a plug secured in the body portion from below, with its upper face forming a rest within said body for the lower end of said valve during the closed position of the valve, substantially as described and for the purpose set forth.

8. A faucet of the character described comprising a body, a valve within said body, an operating frame to open and close said valve automatically, actuated by the vessel to be filled, said frame comprising a pair of arms rigidly connected at their lower ends, a spring tending to depress one of the arms and a shaft carrying the other and the stem of the valve, said arm being adapted to be lifted against the pressure of the spring actuating the other arm by a vessel to be filled for the purpose of opening said valve substantially as described.

This specification signed and witnessed this eighth day of December A. D. 1909.

EVERETT MULDER.

Witnesses:
  ROBT. B. ABBOTT,
  G. V. WHYARD.